Patented June 12, 1951

2,556,721

UNITED STATES PATENT OFFICE 2,556,721

VINYL CHLORIDE RESINS PLASTICIZED WITH CHLORINATED HYDROCARBONS

André Gislon, Paris, and Joseph Quiquerez, Saint-Cloud, France, assignors to Compagnie Francaise de Raffinage (Société Anonyme), Paris, France No Drawing. Application December 27, 1945, Serial No. 637,488

8 Claims. (Cl. 260—33.8)

This invention relates to plasticizers for use in connection with organic polymers and the like including copolymers and condensation polymers, etc., to plasticized compositions and to the method of producing such plasticizers and such compositions. This application is a continuation-in-part of our prior application, Serial No. 585,566, filed March 29, 1945, now abandoned. In our co-pending application, Serial No. 672,705, filed May 27, 1946, there is disclosed the use of halogenated arylalkane compounds as plasticizers, which compounds have more than two aromatic nuclei.

Valuable plasticizers are constituted by compounds of the type:

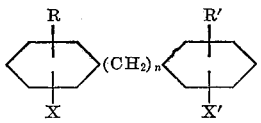

In this formula R and R' are either aliphatic substituents or hydrogen; X and X' are halogenated substituents, without any restriction concerning the number and the position of these substituents and $n$ is a positive integer less than 5. These compounds may be used either alone or in admixture with derivatives containing a halogen, on the latereal chains or on the aliphatic bridge separating the two nuclei.

It is possible to mention by way of example of a compound of this family dichloro-dibenzyl.

Example I

Dibenzyl is chlorinated until it is combined with about 43% of chlorine with reference to the dibenzyl treated.

The reaction product is freed of its gases and washed until all the free hydrochloric acid has disappeared after which it is dried. It contains 30% of chlorine and corresponds to dichlorodibenzyl.

The washed and dried reaction product may be used as a plasticizer under the following conditions:

60 gr. of polyvinyl chloride are mixed with 40 gr. of the plasticizer and the mixture is treated in a drying oven at 80° C. during four hours; the mixture is then kneaded between two cylindrical rolls with or without friction; this provides rapidly a smooth and transparent sheet.

As apparent from the following table the mechanical properties of the product obtained are improved with reference to those provided by plasticizing with tricresyl-phosphate:

| | Breaking load in Kg./cm.$^2$ | Elongation |
|---|---|---|
| | | Per cent |
| Tricresyl-phosphate | 113 | 200 |
| Dichlorodibenzyl | 131 | 240 |

Example II

A commercial product formed by the distillation of the condensation product of dichlorethane with a mixture of benzene and toluene and constituted chiefly by a mixture of dibenzyl, methyldibenzyl and dimethyldibenzyl is chlorinated until a product is obtained containing 30% of chloride, i. e. as an average two atoms of chloride per molecule.

The product is used under the same conditions and provides results of the same kind as dichlorodibenzyl.

Example III

Dichlorethane is condensed with ethylbenzene in the presence of aluminum trichloride in the proportion of 1 mol of dichlorethane to 8 to 10 mols of ethylbenzene. After separation of the uncondenced ethylbenzene an excellent yield of the various isomers of diethyldibenzyl is recovered. This mixture in which the meta-diethyldibenzyl isomer predominates is chlorinated to an average combined chlorine content of 23%. The product thus obtained can be utilized as a plasticizer for polyvinyl chloride.

Example IV

Dichlorethane condensed with an equimolecular mixture of benzene and xylene in the presence of aluminum trichloride is a product consisting primarily of dibenzyl, the various trimethyl dibenzyl isomers and the various tetramethyl-dibenzyl isomers. This product when chlorinated to a combined chlorine content of 24–26% is found to be a very desirable plasticizer in the same products as those with which the dichlorodibenzyl is used.

Example V

1,-4 dichlorobutane is condensed with toluene in the presence of aluminum giving ditolylbutane which is then chlorinated to a combined chlorine content of about 25%. The resulting product is likewise useful as a plasticizer in various polymers.

Example VI

1,-3-dichloropropane is condensed with benzene in the presence of aluminum trichloride. The resulting diphenylpropane is chlorinated to about 25% combined chlorine and the chlorinated product is found to have highly desirable plasticizing properties, e. g. when mixed with polyvinyl chloride.

This discovery is all the more remarkable if it is taken into account that chlorinated diphenyls which do not fall within the definition of the above improved product are as a matter of fact very poor plasticizers and are more adapted for use as a fireproof filler for natural or synthetic rubber.

In the preceding examples I to VI, we have described the production of the substances considered through halogenation of arylalkanes.

Now we have discovered moreover that the manner of preparing such substances is not unimportant. In the case of substances having the same formula and prepared through different methods, we have found that the characteristic properties of the plasticizer substances vary to a degree such that, according to the case, it may be preferable to use a plasticizer prepared in accordance with a given process rather than with another.

Thus we have found that it is of interest to prepare dichloro-dibenzyl by the method consisting in condensing chlorobenzene with dichlorethane in presence of a catalyzer of the Friedel and Craft type. Obviously as will be immediately noticed this manner of preparing the plasticizer leads to a more homogeneous product whereas when dibenzyl is chlorinated there is produced not only dichlorodibenzyl but also non-chlorinated dibenzyl together with monochlorinated and trichlorinated products.

If we thus provide for the condensation of chlorobenzene with dichlorethane, we not only obtain more uniformly halogenated products, but also the degree of chlorination depends only on the aromatic halogenated derivatives operated upon. Thus monochlorobenzene leads to dichlorodibenzyl, dichlorobenzene leads to tetrachlorodibenzyl, etc.

Moreover, the products obtained through condensation contain absolutely no halogen atom combined through addition and are therefore extremely stable.

We have found that beyond the advantages described the plasticizer obtained respectively in accordance with the two above methods of preparation conveyed, for instance to the polyvinyl chloride plasticized by said plasticizers, properties which are too widely different to allow an explanation based solely on differences in homogeneity and purity of the plasticizer used.

We have been led therefore to suppose that two plasticizers which have the same rough formula probably show differences in structure which would explain the differences in properties.

We have found in particular that as far as concerns exudation, color, odor and resistance to cold the products obtained through condensation were better than those obtained through chlorination.

We will now describe by way of example the manner of preparing dichlorodibenzyl although obviously we do not wish to limit to such particular substances this method of preparation which may be construed as capable of general application for the condensation of chlorinated aromatic substances with dihalogenated aliphatic derivatives considered in their widest generality.

We have moreover found that if we operate with an excess of a dihalogenated aliphatic derivative or even in strictly stoichiometric amounts, we obtain a high proportion of highly polymerized products formed by a linking of chlorinated aromatic nuclei separated by aliphatic bridges. Multinuclear products of this type, and their uses, are disclosed in our co-pending application, Serial No. 672,705.

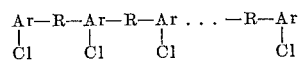

We have found also that it is possible to reduce and even to avoid the formation of highly polymerized products by using a large excess of the aromatic derivative. For instance when using 8 molecules of monochlorobenzene for 1 molecule of dichlorethane there is obtained a raw product containing not more than:

10% of the condensed product (4 aromatic nuclei and more in the chain)
10 to 15% of the 3 nuclei product (boiling point 250 to 300° C. under 20 mm. of mercury)

whereas 75 to 80% are constituted by dichlorodibenzyl boiling between 197 and 210° C. under 20 mm. of mercury. These different products are easily separated through distillation and one obtains thus a product which is very homogeneous from the standpoint of its chlorination grade.

Example VII

There is poured little by little into 1985 gr. of monochlorobenzene in which is dispersed 32 gr. of anhydrous aluminum chloride, 215 gr. of dichlorethane while keeping the temperature at 95 to 100° C. At the end of the reaction which is revealed by the stopping of the evolution of the hydrochloric acid corresponding to the dichlorethane operated upon, the raw product is hydrolysed by pouring it into water, ammoniacal water or alcohol; the unreacted chlorobenzene (1543 gr.) is washed in water and carried away in a current of steam; this produces 456 gr. of halogenated product containing 75% of dichlorodibenzyl, 9% of highly polymerized products and 16% of intermediate products. The raw product may be directly used as a plasticizer with polyvinyl chloride for instance.

The mixing and the calendering with polyvinyl chloride, for instance under the conditions described in the Example I, show no difficulty. The sheet obtained is also smooth and transparent and its mechanical properties are of the same kind as those obtained with the use of tricresylphosphate as a plasticizer.

We have mentioned vinyl chloride polymers above as an example of a plastic in which such a plasticizer is required. The products of this invention are not limited to such plastics, but are useful in general to replace such known plasticizers as tricresylphosphate in any of the usual plastic compositions.

We have also obtained excellent results by using the different plasticizers described hereinabove and chiefly those obtained through condensation, in admixture with other known plasticizers. The mixtures with tricresylphosphate lead to mechanical properties which are superior to those obtained by this latter substance used alone. Inferior and cheap plasticizers, e. g. anthracene oils, when mixed with the improved plasticizers according to the present invention give good quality plastics and thus it is an advantage of these improved plasticizers that they permit dilution with inexpensive products without loss of high quality.

On the other hand our improved plasticizers allow through admixture, the valorization of cheap and low grade plasticizers such as anthracene oils.

What we claim is:

1. A plasticized resin comprising a polymer having individual links of chlorinated monomeric aliphatic vinylic groups and a plasticizer comprising diethyldibenzyl having at least one chlorine substituent on an aromatic ring.

2. A plasticized resin comprising a polymer which is comprised of individual chlorinated monomeric aliphatic vinylic groups and a plasticizer comprising ring-chlorinated diphenylpropane.

3. A plasticized resin comprising a polyvinyl chloride and nuclear dichlorinated dibenzyl as a plasticizer.

4. A plasticized resin comprising a vinyl chloride polymer and a plasticizer having the structural formula:

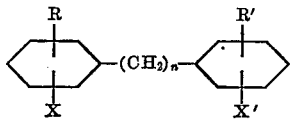

wherein R and R' are selection from the group consisting of aliphatic substituents and hydrogen; X and X' are chlorine substituents; and $n$ is a positive integer smaller than 5; the number and position of all said substituents being unrestricted.

5. A plasticized resin comprising a vinyl chloride polymer and a plasticizer comprising ring-chlorinated dichloro-dibenzyl.

6. A plasticized resin comprising a vinyl chloride polymer and a plasticizer comprising a ring-chlorinated diarylalkane having an aliphatic bridge of less than five carbon atoms.

7. A method of plasticizing a vinyl chloride polymer which comprises mechanically working into said polymer a plasticizer which is a ring-chlorinated diarylalkane having an aliphatic bridge of less than five carbon atoms.

8. A plasticized resin comprising a polyvinyl chloride and a ring-chlorinated diarylalkane constituent having an aliphatic bridge of less than five carbon atoms as a plasticizer.

ANDRÉ GISLON.
JOSEPH QUIQUEREZ.

REFERENCES CITED

The following references are of record in the file of this patent:

UNITED STATES PATENTS

| Number | Name | Date |
| --- | --- | --- |
| 2,285,562 | Britton et al. | June 9, 1942 |
| 2,460,376 | Caprio | Feb. 1, 1949 |

OTHER REFERENCES

Page 188, Morrell Synthetic Resins and Allied Plastics, 2nd edition Oxford University Press, London 1943.